US011896914B2

(12) United States Patent
Lucci et al.

(10) Patent No.: US 11,896,914 B2
(45) Date of Patent: Feb. 13, 2024

(54) LOTTERY TICKET HAVING CROSSWORD BOARD WITH A BONUS GRID FEATURE

(71) Applicant: IGT GLOBAL SOLUTIONS CORPORATION, Providence, RI (US)

(72) Inventors: Anthony Lucci, North Kingstown, RI (US); Jeffrey Schertzer, Valrico, FL (US); Christopher Daren Reaves, Peachtree Corners, GA (US)

(73) Assignee: IGT Global Solutions Corporation, Providence, RI (US)

( * ) Notice: Subject to any disclaimer, the term of this patent is extended or adjusted under 35 U.S.C. 154(b) by 158 days.

(21) Appl. No.: 17/479,537

(22) Filed: Sep. 20, 2021

(65) Prior Publication Data

US 2023/0085707 A1 Mar. 23, 2023

(51) Int. Cl.
*A63F 3/06* (2006.01)
*G07F 17/32* (2006.01)

(52) U.S. Cl.
CPC .......... *A63F 3/0665* (2013.01); *G07F 17/329* (2013.01); *G07F 17/3244* (2013.01)

(58) Field of Classification Search
CPC .......... A63F 3/06; A63F 3/0605; A63F 3/061; A63F 3/0645; A63F 3/065; A63F 3/0655; G07F 17/329
See application file for complete search history.

(56) References Cited

U.S. PATENT DOCUMENTS 5,566,942 A 10/1996 Elum
5,855,514 A 1/1999 Kamille
6,241,246 B1 * 6/2001 Guttin .................. A63F 3/0665 273/272
6,460,854 B1 10/2002 Mccarey
7,300,348 B2 11/2007 Kaminkow et al.
7,458,580 B2 * 12/2008 Martineck ............. A63F 3/0665 273/272
7,604,539 B2 10/2009 Hartl et al.
7,959,188 B2 * 6/2011 Martineck, Sr. ........ A63F 3/065 283/102
8,042,809 B2 10/2011 Walker et al.
8,287,364 B2 10/2012 Caputo et al.
8,460,081 B2 6/2013 Meyer
8,808,080 B2 * 8/2014 Meyer ................... G07F 17/329 463/17
9,728,048 B2 8/2017 Saunders
9,984,534 B2 5/2018 Trainor
10,173,126 B2 1/2019 Brouillard et al.
10,933,303 B2 * 3/2021 Jackson ................ A63F 3/0665
11,185,762 B2 * 11/2021 Jackson .............. A63F 3/00094
2002/0084584 A1 * 7/2002 Yusuf .................... A63F 3/0665 273/274

(Continued)

OTHER PUBLICATIONS

"Pennsylvania Crossword X-tra™ Instant Lottery Game 1537 Department of Revenue Notice". [dated Aug. 14, 2021], [online], [retrieved on Apr. 22, 2023]. <URL:https://www.pacodeandbulletin.gov/Display/pabull?file=/secure/pabulletin/data/vol51/51-33/1288.html>. 5 Pages. (Year: 2021).*

"Crossword X-tra™ (PA-1537)" by PA Lottery. [online], [retrieved on Apr. 22, 2023]. <URL:https://www.palottery.state.pa.us/Scratch-Offs/View-Scratch-Off.aspx?id=3109>. 5 Pages. (Year: 2023).*

(Continued)

*Primary Examiner* — Milap Shah
(74) *Attorney, Agent, or Firm* — Neal, Gerber & Eisenberg LLP

(57) ABSTRACT

A lottery gaming system and method providing a lottery game.

19 Claims, 7 Drawing Sheets

(56) References Cited

U.S. PATENT DOCUMENTS

| | | | | |
|---|---|---|---|---|
| 2004/0195765 | A1 | 10/2004 | Bellefleur | |
| 2005/0167910 | A1* | 8/2005 | Candler | A63F 3/0665 273/138.1 |
| 2006/0160602 | A1* | 7/2006 | Blythe | G07F 17/329 463/17 |
| 2007/0063432 | A1* | 3/2007 | Trudel | A63F 3/0415 273/139 |
| 2008/0042426 | A1 | 2/2008 | Martineck | |
| 2008/0252003 | A1* | 10/2008 | Mahar | A63F 3/0665 273/146 |
| 2009/0167012 | A1 | 7/2009 | Martineck | |
| 2010/0045026 | A1 | 2/2010 | Napolitano et al. | |
| 2010/0113124 | A1* | 5/2010 | Amirsadri | G07F 17/32 463/17 |
| 2011/0042896 | A1 | 2/2011 | Napolitano et al. | |
| 2011/0281629 | A1* | 11/2011 | Meyer | A63F 3/081 463/17 |
| 2014/0011569 | A1 | 1/2014 | Saunders et al. | |
| 2015/0379804 | A1 | 12/2015 | Casey | |
| 2016/0307405 | A1 | 10/2016 | Koll et al. | |
| 2018/0165912 | A1 | 6/2018 | Vengrofski | |
| 2018/0169513 | A1 | 6/2018 | Brouillard et al. | |
| 2020/0398150 | A1 | 12/2020 | Kennedy | |

OTHER PUBLICATIONS

"Crossword X-tra—PA Lottery" by BombDiggity66. YouTube—Broadcast Yourself. [dated Dec. 29, 2022], [online], [retrieved on Apr. 22, 2023]. <URL:https://www.youtube.com/watch?v=VYeiU_C7Cvw>. 2 Pages. (Year: 2022).*

"California Scratcher: Treasure Hunt" by James Hudson. YouTube—Broadcast Yourself. [dated Feb. 9, 2020], [online], [retrieved on Apr. 22, 2023]. <URL:https://www.youtube.com/watch?v=_on9g1mlHxs>. 2 Pages. (Year: 2020).*

"Lights, Camera, Crossword!", Wisconsin Lottery, located at https://www.wilottery.com/games/instant-games/lights-camera-crossword-2372, Jul. 23, 2021.

"Cash Crossword", https://nelottery.com/homeapp/scratch/1163/0/gamedetail/web; available prior to Sep. 20, 2021.

"Cube Cashword", available prior to Sep. 20, 2021.

"Cube Crossword", available at: https://m.nelottery.com/homeapp/static/shared/images/scratch/ticket_art/1172_art.jpg; available prior to Sep. 20, 2021.

"One Word Crossword", https://wvlottery.com/instant-games/one-word-crossword/; available prior to Sep. 20, 2021.

"Search Report", from corresponding United Kingdom patent application No. GB2213611.3.

* cited by examiner

LOTTERY TICKET HAVING CROSSWORD BOARD WITH A BONUS GRID FEATURE

BACKGROUND

The present disclosure relates to a lottery ticket having a crossword with bonus grid feature, and to lottery gaming systems and methods for providing such lottery tickets.

Instant lottery tickets are widely available. Instant lottery tickets may include predetermined win or lose indicia information under one or more coverings such as a scratch-off-coating ("SOC"). The coverings are used to ensure that the lottery ticket has not been previously used, played, or modified. Millions of different types of instant lottery tickets are produced and sold every year.

BRIEF SUMMARY

In various embodiments, the present disclosure provides a lottery ticket including: a substrate; a board on the substrate, the board including multiple of rows and multiple columns, the board defining multiple spaces, each space being at a different intersection of one of the rows and one of the columns; a plurality of first symbols of a first type on the substrate and positioned at a plurality of the multiple spaces defined by the board; a plurality of different row grid coordinates on the substrate and associated with the multiple rows of the board; a plurality of different column grid coordinates on the substrate and associated with the multiple columns of the board; a plurality of player first symbols on the substrate; a player bonus grid coordinate on the substrate; a first removable covering on the substrate covering the player first symbols; and a second removable covering on the substrate covering the player bonus grid coordinate.

In various embodiments, the present disclosure provides a lottery ticket including: a substrate; a crossword board on the substrate, the crossword board including multiple rows and multiple columns, the crossword board defining multiple spaces, each space being at a different intersection of one of the rows and one of the columns; a plurality of different letter symbols on the substrate and positioned at a plurality of the multiple spaces defined by the crossword board; a plurality of different space filler symbols on the substrate and positioned at a plurality of the multiple spaces defined by the crossword board; a plurality of different row grid coordinates on the substrate and associated with the multiple rows of the crossword board; a plurality of different column grid coordinates on the substrate and associated with the multiple columns of the crossword board; a plurality of different player letter symbols on the substrate; a plurality of player different bonus grid coordinates on the substrate; a first removable covering on the substrate covering the player letter symbols; and a second removable covering on the substrate covering the player bonus grid coordinates. The lottery ticket also includes an award associated with the crossword board, the award including one of: (i) a first type award for each combination of the player letter symbols that correspond to the letter symbols of any complete word on the crossword board, (ii) a second type award for each combination of the player letter symbols and player bonus grid coordinates that correspond to the letter symbols of any complete word on the crossword board, (iii) a third type award for each combination of the player bonus grid coordinates that correspond to all of the letter symbols of any complete word on the crossword board, and (iv) a fourth type award for each of the player bonus grid coordinates that correspond to any space filler symbols on the crossword board.

In various embodiments, the present disclosure provides a lottery gaming system including a processor and a memory device that stores a plurality of instructions, that when executed by the processor, cause the processor to cause a lottery ticket to be created, wherein the lottery ticket includes: a substrate; a board on the substrate, the board including multiple rows and multiple columns, the board defining multiple spaces, each space being at a different intersection of one of the rows and one of the columns; a plurality of first symbols of a first type on the substrate and positioned at a plurality of the multiple spaces defined by the board; a plurality of row grid coordinates on the substrate and associated with the multiple rows of the board; a plurality of column grid coordinates on the substrate and associated with the multiple columns of the board; a plurality of player first symbols on the substrate; a player bonus grid coordinate on the substrate; a first removable covering on the substrate covering the player first symbols; and a second removable covering on the substrate covering the player bonus grid coordinate.

Additional features are described in, and will be apparent from, the following Detailed Description and the figures.

DETAILED DESCRIPTION

Figure 1A:
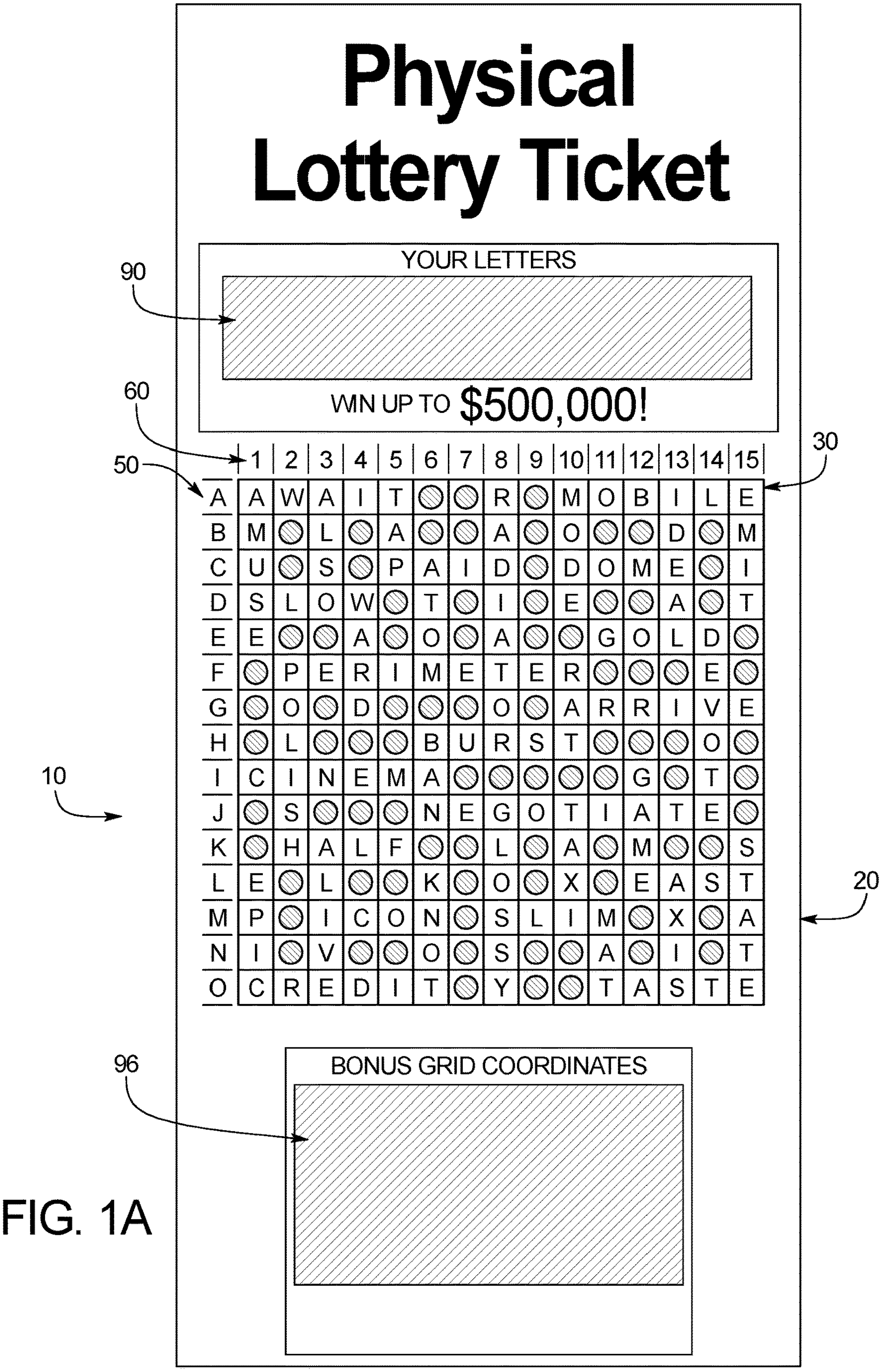
FIGS. 1A and 1B are front views of an example physical lottery ticket of one embodiment of the present disclosure and providing a crossword board with a bonus grid feature.

In various embodiments, the present disclosure relates generally to lottery tickets having a crossword board with a bonus grid feature, and lottery gaming systems and methods of operating a lottery gaming system that provide such lottery tickets. In various embodiments of the present disclosure, each lottery ticket provided by a lottery gaming system includes a board (such as a crossword board) and a bonus grid associated with the board, and has zero, one, or a plurality of awards associated with the board (and thus that lottery ticket).

In various embodiments of the present disclosure, the board of the lottery ticket includes a plurality of rows, a plurality of columns, a plurality of spaces formed by the rows and columns. It should be appreciated that the board can be otherwise suitably configured in accordance with the present disclosure. The lottery ticket further includes a plurality of first symbols that are of a first type (such as letter symbols) respectively in a first plurality of the spaces of the board, and a plurality of second symbols that are of a second type of symbol (such as space filler symbols) respectively in a second plurality of the spaces of the board. The plurality of the first symbols are positioned in a plurality of different patterns (such as different words). The plurality of the second symbols are positioned in spaces of the board between the plurality of patterns (such as between the words) and thus separate the patterns (such as the words) from each other. In various embodiments of the present disclosure, each pattern (such as each word) is either horizontally positioned in a row on the board or vertically positioned in a column on the board. It should be appreciated that the patterns can be otherwise suitably positioned on the board in accordance with the present disclosure. Multiple different patterns (such as multiple different words) can share a same first symbol (e.g., can share a same letter symbol). The quantity of the spaces on the board (and thus quantity of the rows and columns) can vary in accordance with the present disclosure. The plurality of spaces, the plurality of patterns, and the plurality of space filler symbols can be randomly selected or otherwise suitably determined by the gaming system for each lottery ticket. For each lottery ticket, two or more of the plurality of spaces, the plurality of patterns, and/or the plurality of space filler symbols can be different.

In various embodiments of the present disclosure, the bonus grid of the lottery ticket includes a plurality of different first coordinate indication symbols (such as different row indication symbols) respectively associated with a plurality of different first coordinates (such as different row coordinates) of the board. The bonus grid of the lottery ticket also includes a plurality of different second coordinate indication symbols (such as different column indication symbols) respectively associated with a plurality of different second coordinates (such as different column coordinates) of the board. The quantity of the first and second coordinate indication symbols can vary in accordance with the size and configuration of the board in accordance with the present disclosure. The plurality of first coordinate indication symbols (such as row indication symbols) and the plurality of second coordinate indication symbols (such as column indication symbols) thus in combination provide a plurality of different bonus grid coordinates that respectively correspond to all of the spaces of the board.

In various embodiments of the present disclosure, the lottery ticket includes a plurality of different player first symbols (such as different player letter symbols). These player first symbols are randomly selected by or otherwise suitably determined by the gaming system for each lottery ticket. The quantity of these player first symbols for a lottery ticket can vary or be the same for each lottery ticket of a lottery game in accordance with the present disclosure.

In various embodiments of the present disclosure, the lottery ticket also includes one or a plurality of player bonus grid coordinates that each include a combination of one of the first coordinate indication symbols and one of the second coordinate indication symbols. These player bonus grid coordinate indication symbols are randomly selected by or otherwise suitably determined by the gaming system for each lottery ticket. In the examples used herein, the player bonus grid coordinates each include a combination of one of the first coordinate indication symbols and one of the second coordinate indication symbols (and thus each correspond to one of the spaces of the board); however, it should be appreciated that the player bonus grid coordinates can be alternatively configured in accordance with the present disclosure to include: (1) multiple first coordinate indication symbols; (2) multiple second coordinate indication symbols; (3) only one first coordinate indication symbol; (4) only one second coordinate indication symbols; and/or (5) other suitable configurations such that a player bonus grid coordinate can correspond to one or more spaces of the board. The quantity of these player bonus grid coordinates of each lottery ticket can vary or be the same for each lottery ticket of a lottery game in accordance with the present disclosure.

In various embodiments of the present disclosure, the lottery ticket further includes: (a) a first covering (such as a scratch-off coating for the physical lottery tickets) over the plurality of player letter symbols for the lottery ticket; and (b) a second covering (such as a scratch-off coating for physical lottery tickets) over the plurality of player bonus grid coordinates for the lottery ticket. In various different embodiments, the first and second coverings can be separate or can be continuous depending on the specific configuration of the lottery ticket.

For purposes of explaining the present disclosure and for brevity, the first symbols are letters A through Z and form patterns in the form of words, the space filler symbols are color symbols, the first coordinate indication symbols are the letters A through O, and the second coordinate indication symbols are the numbers 1 through 15 herein; however, it should be appreciated that such examples are not meant to limit the present disclosure.

In various embodiments of the present disclosure, each lottery ticket provides multiple ways for a player of the lottery ticket to potentially win awards (even though any particular lottery ticket may be associated with zero awards, only one award, a plurality of but less than a maximum quantity of potential awards, or the maximum quantity of potential awards).

The first way for the player to win one or more awards is via the revealing of the plurality of the player letter symbols and a determination of whether any combinations of the player letter symbols match the letters of any of the complete words on the crossword board. For this first award determination, the player wins an award for each complete word on the crossword board formed by any combination of the player letter symbols. Different words can have different awards associated with such words in any suitable manner. For example, words with a greater quantity of letters can have higher awards associated with such words than words with a fewer quantity of letters. In another example, words with a one or more harder to obtain letters can have higher awards associated with such words than words with easier to obtain letters. In this second example, the likelihood that a player obtains the different letters can be suitably differently weighted.

The second way for the player to win one or more awards is via the revealing of the plurality bonus grid coordinates and the determination of whether any combination of player letter symbols and player bonus grid coordinates form any complete words on the crossword board. For this second award determination, each of the player bonus grid coordinates essentially functions as the letter symbol at those coordinates to complete the one or more words having letters at those coordinates. The awards associated with the words as described above can be employed for these awards. In other embodiments, if a bonus grid coordinate is used to complete a word, the award associated with such word could be different than the award associated with the word if only player letter symbols are employed to complete such word.

The third way for the player to win one or more awards is via the revealing of the player plurality bonus grid coordinates and the determination of whether any combination of the player bonus grid coordinates form any complete words on the crossword board. For this third award determination, each of the player bonus grid coordinates essentially functions as the letter at those coordinates to form the one or more words including letters at those coordinates.

The awards associated with the words as described above can be employed for these awards. In other embodiments, if bonus grid coordinates are solely used to complete a word, the award associated with such word could be different than the award associated with the word if only player letter symbols are employed to complete such word and/or if the combination of player letter symbols and player bonus grid coordinates are employed to complete such word.

The fourth way for the player to win one or more awards is via the revealing of the player plurality bonus grid coordinates and the determination of whether any of the player bonus grid coordinates are for spaces on the board with any space filler symbols that have any awards associated with those space filler symbols. For this fourth award determination, each of the player bonus grid coordinates that is associated with one of the spaces at which a space filler symbol is positioned can result in an award or an accumulation of space filler symbols that can result in an award. Different space filler symbols can have different awards associated with such space filler symbols in any suitable manner. Accumulated combinations of different space filler symbols can alternatively or additionally have different awards associated with such combinations of space filler symbols in any suitable manner. It should be appreciated that the space filler symbols can be any suitable symbols (including different colors or other graphics), that quantity of space filler symbols can vary, and that the quantities of different and/or like space filler symbols can vary, in accordance with the present disclosure.

Figure 1B:
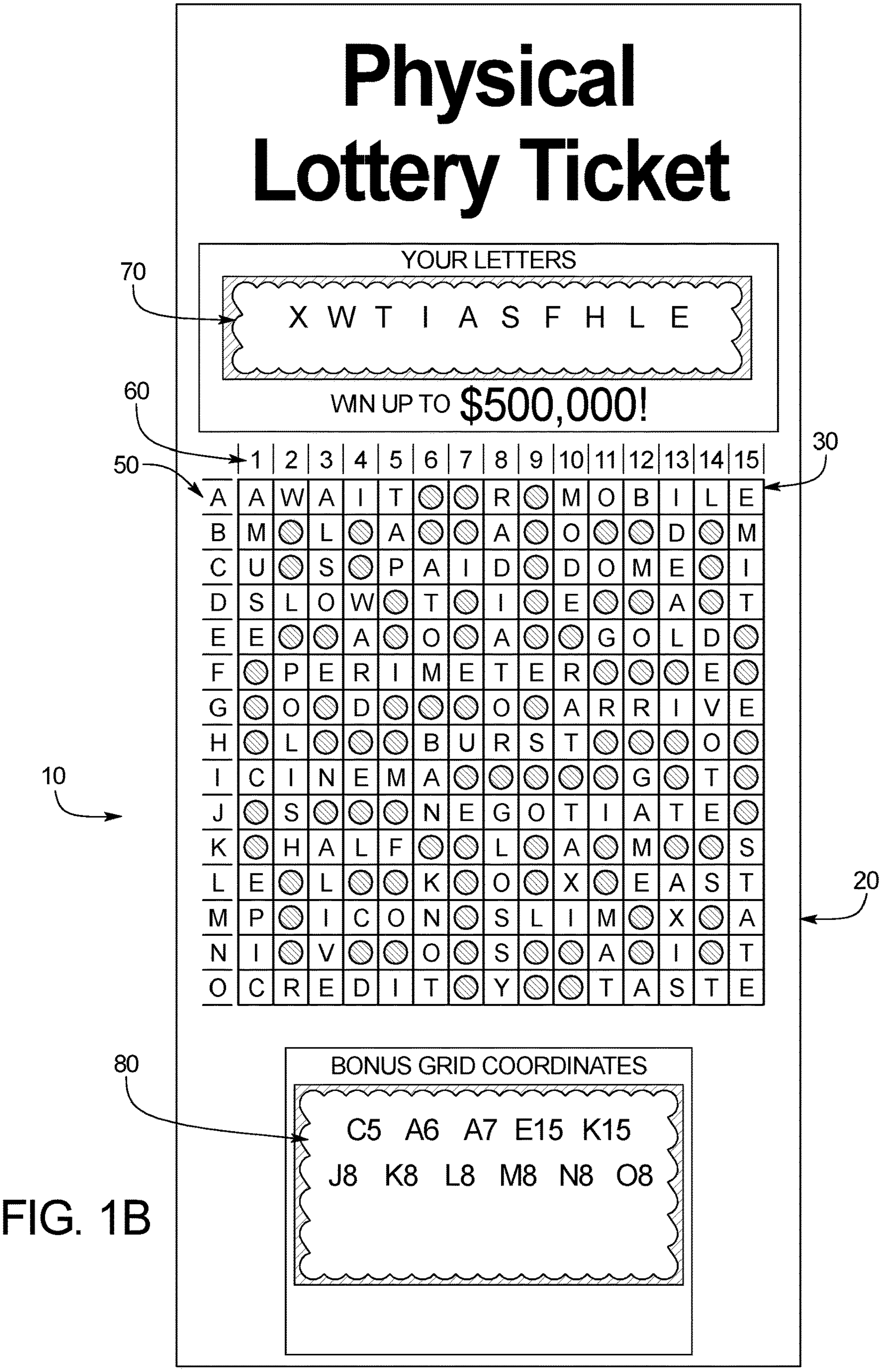

FIGS. 1A and 1B illustrate an example physical lottery ticket 10 of one embodiment of the present disclosure that may be purchased by a player. In this example embodiment, the lottery ticket 10 includes a physical substrate 20, a crossword board 30 printed on the physical substrate 20, row grid coordinates 50 (A through O) printed on the physical substrate 20, column grid coordinates 60 (1 through 15) printed on the physical substrate, a player letter symbols 70 (shown in FIG. 1B) printed on the physical substrate 20, and player bonus grid coordinates 80 (shown in FIG. 1B) printed on the physical substrate 20. The physical lottery ticket 10 further includes a first scratch-off coating 90 (shown in FIG. 1A) applied on the physical substrate 20 and initially covering the player letter symbols 70 and a second scratch-off coating 96 (shown in FIG. 1A) applied on the physical substrate 20 and initially covering the player bonus grid coordinates 80. FIG. 1B shows the physical lottery ticket 10 with the first scratch-off coating 90 removed from the player letter symbols 70 and the second scratch-off coating 96 removed from the player bonus grid coordinates 80. The crossword board 30 includes a plurality of different letter symbols (not individually labeled) in a plurality of the spaces of the crossword board 30, and a plurality of space filler symbols (not individually labeled) in a plurality of the spaces of the crossword board 30.

It should be appreciated that in various embodiments, the physical lottery ticket 10 can include and thus display additional information, such as a lottery ticket identification information (not shown) and/or any other relevant lottery ticket related information (not shown). It should also be appreciated that physical lottery ticket 10 can be manufactured in various known manners or in new manners for producing physical lottery tickets. It should be appreciated that the quantity and configurations of rows of the crossword board, row grid coordinates, columns of the crossword board, column grid coordinates, player letter symbols, and/or player bonus grid coordinates can vary in accordance with the present disclosure.

Figure 2:
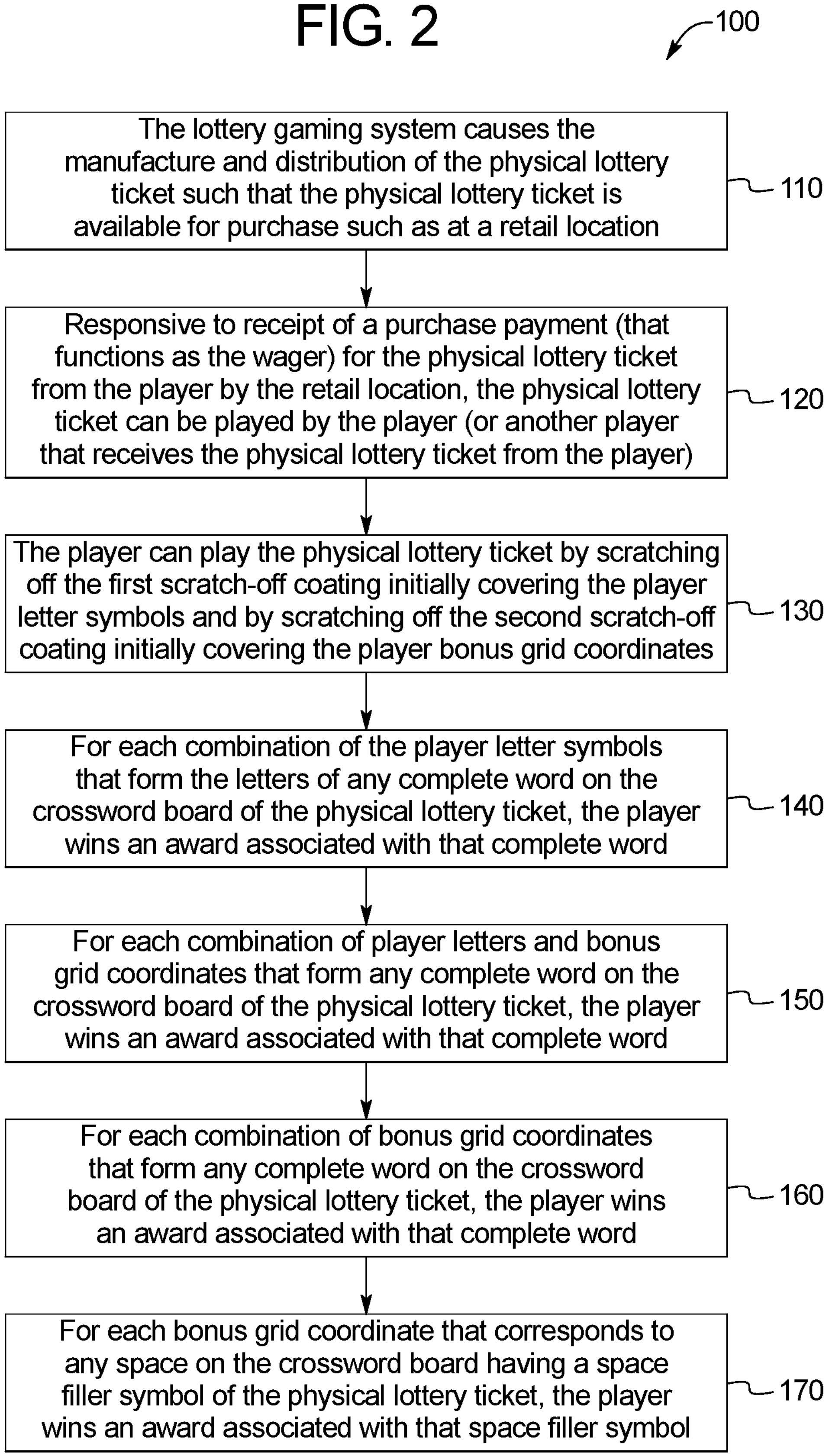
FIG. 2 is a flowchart of an example method of providing the example physical lottery ticket of FIG. 1.

FIG. 2 is a flowchart of an example method 100 of providing this example physical lottery ticket of the present disclosure.

In the example method illustrated in FIG. 2, the lottery gaming system causes the manufacture and distribution of the physical lottery ticket such that the physical lottery ticket is available for purchase such as at a retail location, as indicated by block 110. The retail location can, for example, be a retail establishment that sells lottery tickets or can be an electronic lottery ticket provider such as lottery ticket kiosk, or otherwise as explained below.

Responsive to receipt of a purchase payment (that functions as the wager) for the physical lottery ticket from the player by the retail location, the physical lottery ticket can be played by the player (or another player that receives the physical lottery ticket from the player), as indicated by block 120.

The player can play the physical lottery ticket by scratching off the first scratch-off coating initially covering the player letter symbols and by scratching off the second scratch-off coating initially covering the player bonus grid coordinates, as indicated by block 130. The player can do this in any suitable order.

For each combination of the player letter symbols that form the letters of any complete word on the crossword board of the physical lottery ticket, the player wins an award associated with that complete word, as indicated by block 140. The first type award is thus for each combination of the player letter symbols that correspond to the letter symbols of any complete word on the crossword board.

For each combination of player letters and player bonus grid coordinates that form any complete word on the crossword board of the physical lottery ticket, the player wins an award associated with that complete word, as indicated by block 150. The second type award is thus for each combination of the player letter symbols and player bonus grid coordinates that correspond to the letter symbols of any complete word on the crossword board.

For each combination of player bonus grid coordinates that form any complete word on the crossword board of the physical lottery ticket, the player wins an award associated with that complete word, as indicated by block 160. The third type award is thus for each combination of the player bonus grid coordinates that correspond to all of the letter symbols of any complete word on the crossword board.

For each of the player bonus grid coordinates that corresponds to any space on the crossword board having a space filler symbol of the physical lottery ticket, the player wins any award associated with that space filler symbol, as indicated by block 170. This fourth type award is thus for each of the player bonus grid coordinates that correspond to any space filler symbols on the crossword board. In alternative embodiments, two or more of the player bonus grid coordinates can be associated with spaces that cause an accumulation of space filler symbols at those spaces and that can result in an award. For example, if the player bonus grid coordinates correspond to three designated space filler symbols on the board that are associated with an award, the player wins that award. The space filler symbols can be arranged as sets of different space filler symbols that can be collected, wherein if a set of space filler symbols are collected, the player wins an award associated with that set of space filler symbols.

In the example method illustrated in FIG. 2, the player can redeem any of the above awards won by the player based on the physical lottery ticket at a retail location such as the retail establishment or lottery ticket kiosk that sold the player the lottery ticket or another suitable retail location, as indicated by block 180.

In the example of FIGS. 1A and 1B, the combination of the player letters X, W, T, I, A, S, F, H, L, and E form the letters of the complete words AWAIT, TAXI, STATE, EAST, and HALF on the crossword board 30 and the player wins the awards of $5.00, $3.00, $2.00, $1.40, and $1.00 respectively associated with those complete words.

In this example, the combination of player letters X, W, T, I, A, S, F, H, L, and E and bonus grid coordinates C5, A6, A7, E15, K15, J8, K8, L8, M8, N8, and O8 form the letters of the additional complete word TAP on the crossword board 30, and the player wins the award of $1.40 associated with those complete words.

In this example, the combination of bonus grid coordinates C5, A6, A7, E15, K15, J8, K8, L8, M8, N8, and O8 form the complete word of GLOSSY on the crossword board 30, and the player wins an award of $5,000 associated with that complete word.

In this example, the bonus grid coordinates A6, A7, and E15, correspond to the space filler symbols on the board, and the player wins an award of $100, $50, and $25 associated with those space filler symbols.

Figure 3A:
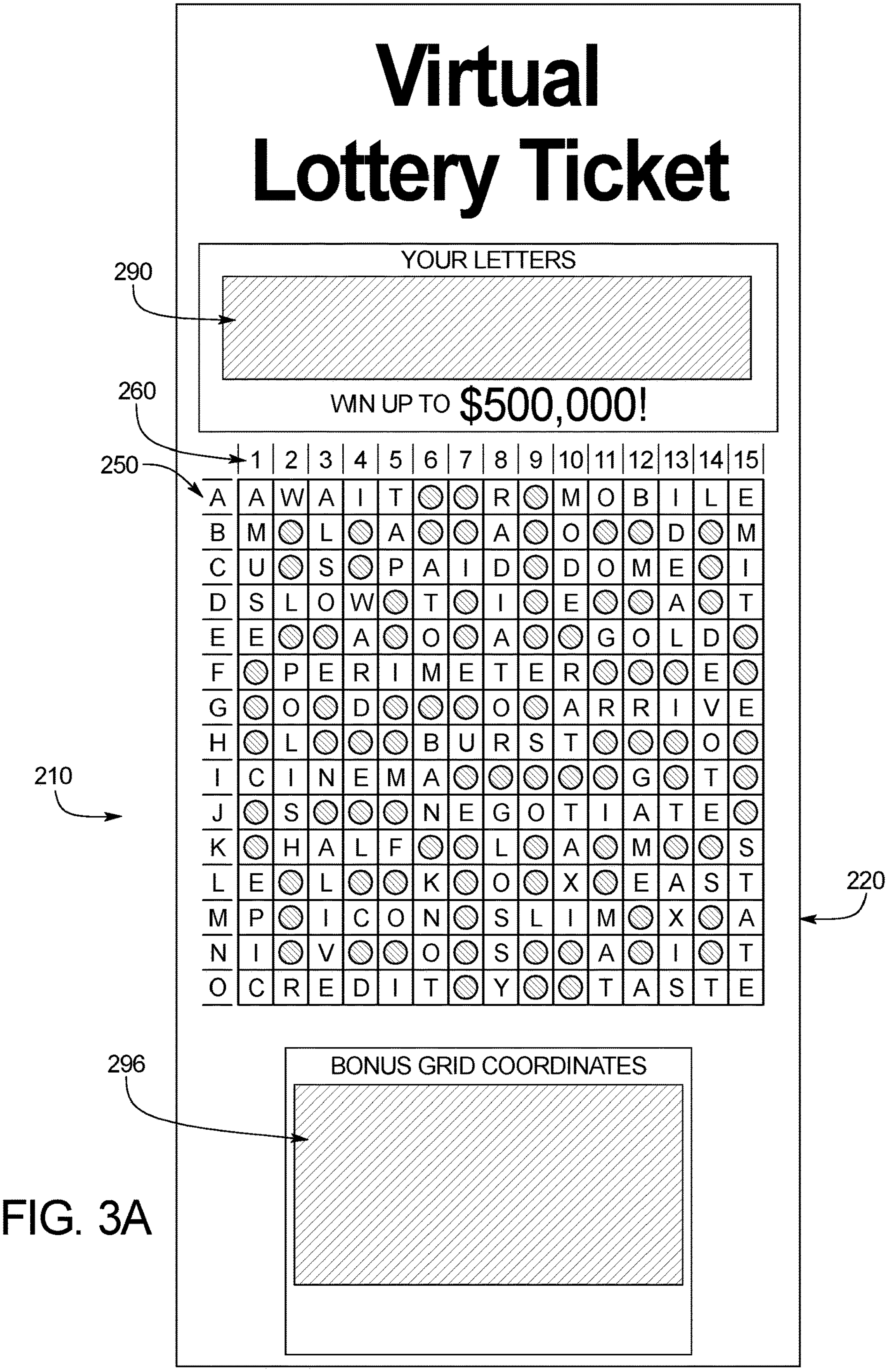
FIGS. 3A and 3B are front views of an example virtual lottery ticket of one embodiment of the present disclosure and providing a crossword board with a bonus grid feature.
Figure 3B:
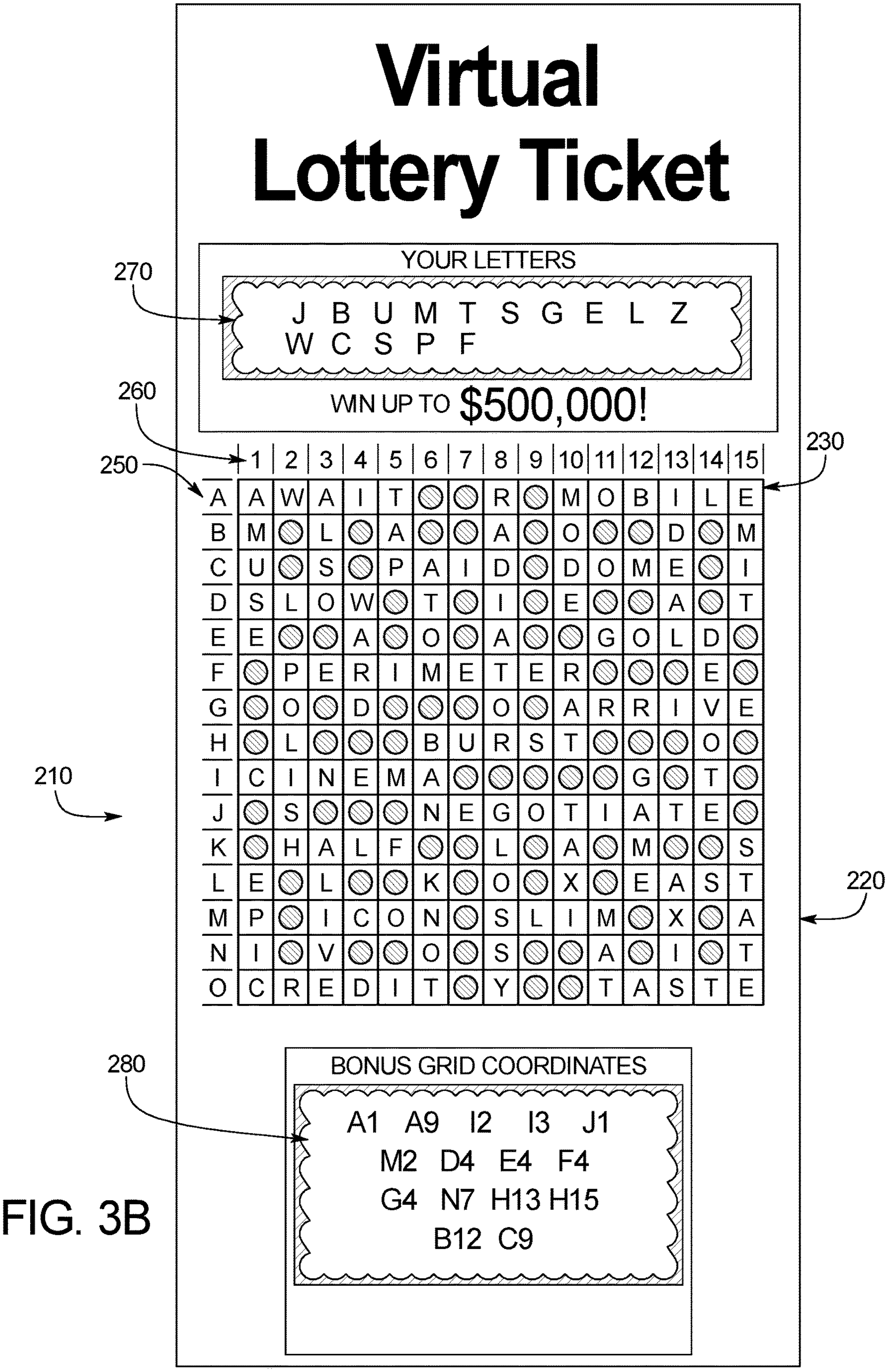

FIGS. 3A and 3B illustrate an example virtual lottery ticket 210 of the present disclosure that may be purchased by a player. In this example embodiment, the virtual lottery ticket 210 includes virtual substrate 220, a crossword board 230 on the virtual substrate 220, row grid coordinates 250 on the virtual substrate 220, column grid coordinates 260 on the virtual substrate 220, player letter symbols 270 (shown in FIG. 3B) on the virtual substrate 220, and player bonus grid coordinates 280 (shown in FIG. 3B) on the virtual substrate 220. The virtual lottery ticket 210 further includes a first covering 290 (shown in FIG. 3A) initially covering the player letter symbols 270 and a second covering 296 (shown in FIG. 3A) initially covering the player bonus grid coordinates 280. FIG. 3B shows the virtual lottery ticket 10 with the first covering 290 removed from the player letter symbols 270 and the second covering 296 removed from the player bonus grid coordinates 280. The crossword board 230 includes a plurality of different letter symbols (not individually labeled) in a plurality of the spaces of the crossword board 230, and a plurality of space filler symbols (not individually labeled) in a plurality of the spaces of the crossword board 30.

It should be appreciated that in various embodiments, the virtual lottery ticket can include and thus display additional information, such as virtual lottery ticket identification information (not shown) and/or any other relevant virtual lottery ticket related information (not shown). It should be appreciated that virtual lottery ticket 210 can be manufactured in various known manners or in new manners for producing virtual lottery tickets. It should be appreciated that the quantity of row of the crossword board, row grid coordinates, columns of the crossword board, column grid coordinates, player letter symbols, and/or player bonus grid coordinates can vary in accordance with the present disclosure.

Figure 4:
FIG. 4 is a flowchart of an example method of providing the example virtual lottery ticket of FIG. 1.

FIG. 4 is a flowchart of an example method 400 of operating an example lottery system of the of the present disclosure that can provide the virtual lottery ticket 210. In various embodiments, the method is represented by a set of instructions stored in one or more memory devices and executed by one or more processors. Although the method is described with reference to the flowchart shown in FIG. 4, many other processes of performing the acts associated with this illustrated example method may be employed. For example, the order of certain of the illustrated blocks may be changed, certain of the illustrated blocks may be optional, or certain of the illustrated blocks may not be employed.

In the example embodiment illustrated in FIG. 4, the lottery gaming system is configured to produce the virtual lottery ticket, and make the virtual lottery ticket available for purchase such as via a suitable web site or application such as an app downloadable on a player mobile device (commonly called an “app”), as indicated by block 410. The web site or app can be any suitable web site or app that provides and sells virtual lottery tickets.

Responsive to receipt of a purchase payment (that functions as the wager) for the virtual lottery ticket from the player via the web site or app, the virtual lottery ticket can be played by the player, as indicated by block 420. It should be appreciated that the lottery gaming system can alternatively, after receiving a purchase payment (that functions as the wager) for the virtual lottery ticket from the player, then create the virtual lottery ticket for the player, store data associated with the virtual lottery ticket, and provide the player a virtual copy of the virtual lottery ticket via the web site or app. Thus, it should be appreciated that in various example embodiments, the player may purchase a virtual lottery ticket such as with a personal mobile device or other computing device, and thus would not be provided with a physical lottery ticket.

The player can play the virtual lottery ticket by making one or more inputs to remove the covering from the player letter symbols and to remove the covering from the player bonus grid coordinates, as indicated by block 430. The play can make the input via the input device (such as a touch screen) of the player mobile device or other computing device. The player can do this in any suitable order or manner in accordance with the present disclosure.

For each combination of the player letter symbols that form the letters of any of complete word on the crossword board of the virtual lottery ticket, the player wins an award associated with that complete word, as indicated by block 440.

For each combination of player letters and player bonus grid coordinates that form any complete word on the crossword board of the virtual lottery ticket, the player wins an award associated with that complete word, as indicated by block 450.

For each combination of player bonus grid coordinates that form any complete word on the crossword board of the virtual lottery ticket, the player wins an award associated with that complete word, as indicated by block 460.

For each of the player bonus grid coordinates that corresponds to any space having a space filler symbol on the crossword board of the virtual lottery ticket, the player wins any award associated with that space filler symbol, as indicated by block 470. In alternative embodiments as described above, two or more of the player bonus grid coordinates can be associated with spaces that cause an accumulation of space filler symbols at those spaces and that can result in an award.

In the example method illustrated in FIG. 4, the player can redeem any of the above awards won by the player for the virtual lottery ticket via the web site or app (or in another suitable manner), as indicated by block 480.

At such time of redemption, the lottery system will validate the virtual lottery ticket and determine any award(s) associated with the virtual lottery ticket that are payable to the player, as indicated by block 490.

The lottery system will cause a payout of any such determined award(s) to the player for the virtual lottery ticket, as indicated by block 495.

In this example of FIGS. 3A and 3B, the combination of the player letters J, B, U, M, T, S, G, E, L, Z, W, C, S, P, and F only form the letters of the complete word BURST on the crossword board 230 and the player wins the awards of $12.00 associated with that complete word.

In this example, the combination of player letters J, B, U, M, T, S, G, E, L, Z, W, C, S, P and bonus grid coordinates A1, A9, I2, I3, J1, M2, D4, E4, F4, G4, N7, K13, H15, B12, and C9 form the letters of the complete words AMUSE and WARD on the crossword board 230, and the player wins awards of $9.00 and $7.00 respectively associated with those complete words.

In this example, the combination of bonus grid coordinates A1, A9, I2, I3, J1, M2, D4, E4, F4, G4, N7, K13, H15, B12, and C9 form no complete words on the crossword board 230, and the player wins no awards for those bonus grid coordinates.

In this example, the bonus grid coordinates A9, J1, M2, N7, K13, H15, B12, and C9 correspond to the space filler symbols in those spaces, and the player wins awards of $10.00, $10.00, $20.00, $20.00, $5.00, $10.00, $15.00, and $10.00 respectively associated with those space filler symbols.

It should be appreciated that the award paytable for physical or virtual lottery tickets can be alternatively configured. In various embodiments, the awards are based on the quantity of words completed. For example, (1) completion of three words can result in an award of $5; (2) completion of four words can result in an award of $10; (3) completion of five words can result in an award of $25; (4) completion of six words can result in an award of $50; (5) completion of seven words can result in an award of $100; (6) completion of eight words can result in an award of $500; (7) completion of nine words can result in an award of $1,000; and (8) completion of ten words can result in an award of $100,000 (which functions as a top or jackpot award). In alternative embodiments, completion of all of the words is needed for the top award. It should also be appreciated that these example awards do not vary based on whether bonus grid coordinates are used to complete such words. In other embodiments, one or more of the awards can vary based on whether bonus grid coordinates are used to complete one or more words. These types of awards can be considered a fifth type of award.

In a further example, certain of the space filler related awards can be based on the different space fillers. For example: (1) collection of three of a first type of space filler symbol (such as a first type of gem) can result in a first award of $20; (2) collection of three of a second type of space filler symbol (such as a second type of gem) can result in a second award of $30; (3) collection of three of a third type of space filler symbol (such as a third type of gem) can result in a third award of $100; (4) collection of three of a fourth type of space filler symbol (such as a fourth type of gem) can result in a first award of $500; and (5) collection of three of a fifth type of space filler symbol (such as a fifth type of gem) can result in a fifth award of $1000. These types of awards can be considered a sixth type of award.

It should be appreciated that the award paytables can also be positioned on the lottery tickets in a suitable manner.

Example Lottery Gaming Systems—General

In various embodiments of the present disclosure, the lottery gaming system and method are configured to be provided by a lottery agency (such as a state lottery agency). In various other embodiments of the present disclosure, the lottery gaming system and method are configured to be operated by a third party that runs the lottery for a lottery agency (such as a state lottery agency).

Figure 5:
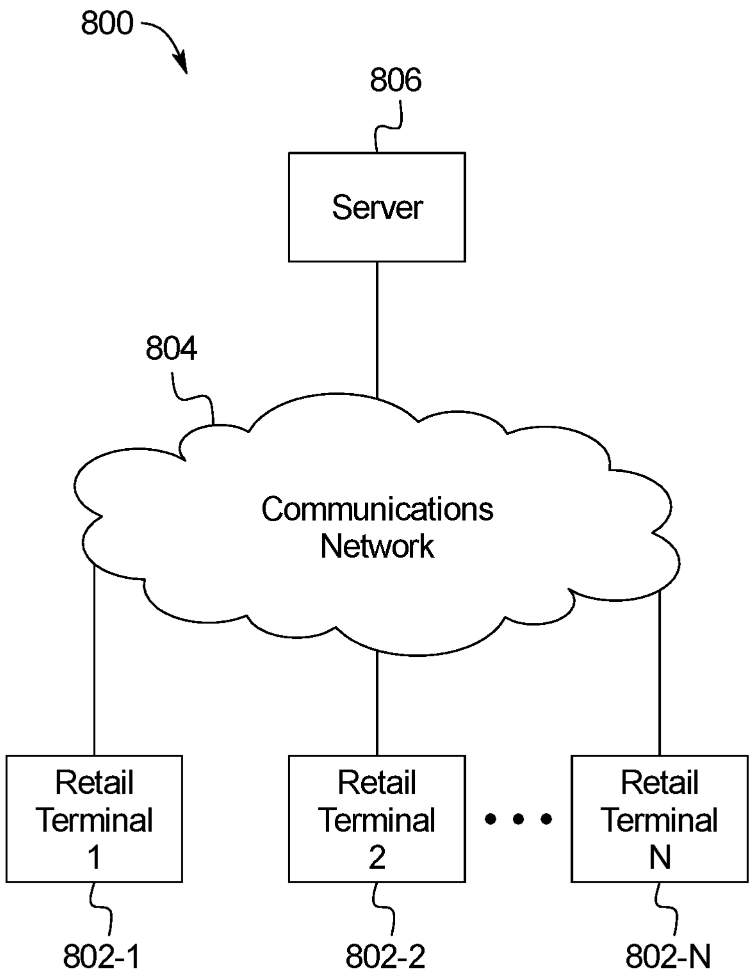
FIG. 5 depicts an example lottery gaming system of one embodiment of the present disclosure.

FIG. 5 illustrates an example networked lottery gaming system 800 for certain types of lottery ticket implementations. This example network lottery gaming system 800 generally includes: (1) a plurality of lottery retailer terminals 802-1 to 802-N; (2) a communications network 804; and (3) one or more lottery servers such as lottery server 806. Generally, the retailer terminals 802-1 to 802-N and the lottery server 806 are configured to perform certain functions described above and further described below.

In various embodiments of the lottery gaming systems and methods of the present disclosure, the player can purchase a respective physical or virtual lottery ticket via a suitable manner such as, but not limited to, one of the following: (1) a dedicated lottery kiosk (e.g., a lottery kiosk) configured to communicate over a data network (such as the Internet) to a lottery server (such as a lottery server 806 described below in connection with FIG. 5); (2) a retailer-operated lottery terminal configured to communicate over a data network (such as the Internet) to a lottery server (such as a lottery server 806 described below in connection with FIG. 5); (3) a personal computer configured to communicate over a data network (such as the Internet) to a lottery server (such as a lottery server 806 described below in connection with FIG. 5); and/or (4) a personal mobile device (such as a cellular telephone, tablet, or PDA) configured to communicate over a data network (such as a wireless or cellular data network) to a lottery server (such as a lottery server 806 described below in connection with FIG. 5).

In the example embodiment of FIG. 5, each retailer terminal 802 corresponds to (or is associated with) a particular lottery retailer. For example, the first retailer terminal 802-1 of FIG. 5 may be associated with a first lottery retailer, such as a convenience store, and the second retailer terminal 802-2 of FIG. 5 may be associated with a second lottery retailer, such as a supermarket. It should be understood that any suitable quantity of lottery retailer terminals may be employed in the lottery gaming system 800, along with any suitable quantity of corresponding lottery servers 806.

In various example embodiments, the lottery retailer terminal 802 includes one or more processor(s). Generally, the processor is operative to perform or process instructions, and in particular, to operate in accordance with the various methods described herein. For example, the processor of the lottery retailer terminal 802 may be operable to enable the lottery retailer terminal 802 to transmit data to (and receive data from) the lottery server 806. More specifically, the processor may enable the transmission of data representing each lottery ticket such as upon a player redeeming a physical lottery ticket at such lottery retailer.

In various example embodiments, the lottery retailer terminal 802 includes one or more input device(s). The input devices of the lottery retailer terminal 802 may include components such as an optical scanner and/or a barcode scanner, for reading and/or for deriving information associated with a lottery ticket. For example, a lottery ticket may include registration marks, authenticity data, various codes, micro-printed indicia, one or more sense marks, and/or other lottery indicia that must be read. Examples of additional input devices include, but are not limited to, a keypad, a mouse, an image capturing device (e.g., an optical character recognition (OCR) device), a biometric reader, a portable storage device (e.g., a memory stick), and the like.

In various example embodiments, the input device(s) of one or more of the lottery retailer terminals 802 may include a clock. The clock may be employed to detect, derive and/or append time and/or date information for use by the lottery server 806 to: (i) create a data record corresponding to lottery tickets purchased or redeemed at the lottery retailer terminal 802, (ii) to determine redemption time, round and/or date information associated with lottery tickets, and/or (iii) determine whether a lottery player has redeemed their lottery ticket in a manner that qualifies the player to receive a particular redemption or settlement amount.

In various example embodiments, one or more of the lottery retailer terminals 802 includes one or more output device(s). Such output device(s) may include such components as a display for outputting information to a lottery player or to a terminal operator (e.g., win/loss information and/or payout amounts), one or more benefit output devices (e.g., a cash drawer, a currency dispenser), a printer for producing a physical record (e.g., paper slip, receipt, ticket, voucher, coupon, etc.) that defines a lottery ticket, audio/video output device(s), and the like.

In various example embodiments, one or more of the lottery retailer terminals 802 also includes one or more communications port(s), such as a serial port, a modem or the like. Generally, the communications port of the lottery retailer terminal 802 may be operable to facilitate two-way data communications between (i) the lottery retailer terminal 802, and (ii) the lottery server 806. In accordance with some embodiments, the communications port of the lottery retailer terminal 802 may operate to facilitate the transmission of information between the lottery retailer terminal and a player device such as a personal digital assistant (PDA), cell phone and/or a dedicated (e.g., a proprietary) device.

In various example embodiments, one or more of the lottery retailer terminals 802 includes a data storage device such as a hard disk, optical or magnetic media, random access memory (RAM) and/or read-only memory (ROM), or the like memory device. Generally, the data storage device of the lottery retailer terminal 802 stores a software program, the software program enabling a processor of the retailer terminal 802 to perform various functions including some or all of the various steps described herein. For example, in accordance with certain embodiments, the lottery retailer terminal 802 may be configured to perform some or all of the functions of the lottery server 806 (and vice versa) such that the lottery server 806 and the lottery retailer terminal 802 may be considered as the same "device."

In various example embodiments, a lottery ticket sales device may be utilized in place of a lottery retailer terminal 802. Such a lottery ticket sales device may be implemented as a lottery server, a controller, a dedicated hardware circuit, an appropriately programmed general-purpose computer, or any other equivalent electronic, mechanical or electro-mechanical device. Thus, in various embodiments, a lottery ticket sales device may include, for example, but is not limited to: (1) a video lottery terminal that may include a touch sensitive screen for use by a player; (2) a personal computer (e.g., which communicates with a remote lottery server); or (3) a personal mobile device such as a mobile telephone, a tablet, or a personal digital assistant. The lottery ticket sales device may include any or all of the devices of the aforementioned systems.

In this example embodiment, the lottery server 806 operates to: (1) receive and/or store data associated with one or more lottery tickets including such data as: (a) ticket identifier(s), and (b) ticket indicia; (2) determine at least a first redemption amount associated with a lottery ticket; (3) receive a redemption request associated with the lottery ticket; (4) determine a time of play associated with the redemption request; and (5) transmit an indication of the appropriate redemption amount to a lottery retailer terminal (e.g., for output or display to a lottery player and/or lottery terminal operator).

In various example embodiments, the lottery server 806 includes one or more processor(s). Such a processor functions to process instructions, and in particular, to operate in accordance with various methods described herein. For example, the processor may operate to enable the lottery server 806 to transmit data to (and receive data from) the lottery retailer terminal 802. More specifically, the processor of the lottery server 806 may enable the transmission of data representing a lottery ticket, as well as information defining one or more payout(s) associated with that lottery ticket to or by a specific one of the lottery retailer terminals 802 shown in the lottery network 800 of FIG. 5. Thus, the lottery server 806 may be implemented as a system controller, a dedicated hardware circuit, an appropriately and particularly programmed general-purpose computer, or any other equivalent electronic, mechanical or electro-mechanical device capable of providing for one or more of the embodiments described herein.

In various example embodiments, the lottery server 806 includes one or more input device(s). Examples of such input devices include a keypad, a mouse, a touch-screen, a random number generator, a microphone, and other digital or analog input devices.

In various example embodiments, the lottery server 806 also includes one or more output device(s). Example of output device(s) of the lottery server 806 include a monitor or other display for outputting information to an operator of the lottery server 806 (e.g., for displaying information such as statistical or sales data, win and loss information and/or payout amounts), a printer for producing a physical record (e.g., a report) of such data, and the like. In addition, the lottery server 806 may include one or more communications ports, such as a serial port, modem or the like, operable to facilitate two-way data communications between (i) the lottery server 806 and (ii) one or more lottery retailer terminals 802.

In various example embodiments, the lottery server 806 includes a data storage device (e.g., a hard disk or hard drive, a media-based (removable) memory, or the like). In certain embodiments, the data storage device of the lottery server 806 stores at least one software program, which includes a program to enable the processor of the lottery server 806 to perform some or all of the various steps and functions of at least one implementation of the methods described in detail herein. In addition, the data storage device of the lottery server 806 may operate to store one or more databases including a lottery ticket database and a lottery ticket redemption status database.

In various example embodiments, the lottery server 806 includes a lottery ticket server device that is located at a lottery ticket printing facility, and may also function to manage the ticket printing process. The lottery server 806 may also function to develop a lottery game matrix (e.g., determining base payouts, win frequencies, and the like) and to match static lottery content with secure paytable (or payout distribution) data. In certain embodiments, a lottery ticket printer device for use in such lottery gaming systems may utilize the game matrix information from the lottery server and may apply it to the secure paytable data.

In certain example embodiments, a retailer terminal (such as the first retailer terminal 802-1) of FIG. 5 is configured to perform some or all of the functions of the lottery server 806. Thus, in certain example embodiments, the lottery server 806 and the retailer terminal (such as the first retailer terminal 802-1) (or another given retailer terminal and server pairing) may be considered as the same "device."

Generally, the communications network 804 of FIG. 5 includes one or more local and/or wide-area network(s) proprietary and/or public network(s) (e.g., the Internet) for facilitating two-way data communications between the retailer terminals 802 and the lottery server 806. The lottery server 806 may communicate with lottery retailer terminals 802 directly or indirectly, via a wired or wireless medium, such as via the Internet, via a local area network (LAN), via a wide area network (WAN), via an Ethernet, via a Token Ring, via a telephone line, via a cable line, via a radio channel, via an optical communications line, via a satellite communications link, or via any other appropriate communications system or combinations thereof. Any number and type of devices may be in communication with the lottery server 806, and communication between the lottery retailer terminals 802 and the lottery server 806 may be direct or indirect. A variety of communications protocols may be part of any such communications system, including, but not limited to: Ethernet (or IEEE 802.3), SAP, ATP, Bluetooth™, and TCP/IP.

It should be understood that devices in communication with each other need not be continually transmitting to each other. On the contrary, such devices need only transmit to each other as necessary, and may actually refrain from exchanging data most of the time. For example, a device in communication with another device via the Internet may not transmit data to the other device for days or weeks at a time. In some embodiments, a server may not be necessary and/or preferred. For example, in one or more embodiments, methods described herein may be practiced on a stand-alone gaming device and/or a gaming device in communication only with one or more other gaming devices. In such an embodiment, any functions described as performed by the computer may instead be performed by one or more gaming devices.

As used herein, a lottery retailer may include a merchant who sells lottery tickets at a particular location, authenticates winning lottery tickets, redeems authenticated winning lottery tickets, and/or provides awards to players for winning lottery tickets. Examples of various lottery retailers include, but are not limited to, convenience stores, gas stations, supermarkets, and gaming establishments.

Various changes and modifications to the present embodiments described herein will be apparent to those skilled in the art. Such changes and modifications can be made without departing from the spirit and scope of the present subject matter and without diminishing its intended technical scope. It is therefore intended that such changes and modifications be covered by the appended claims.

The invention claimed is:

1. A lottery ticket comprising:

a substrate;

a board on the substrate, the board comprising multiple of rows and multiple columns, the board defining multiple spaces, each space being at a different intersection of one of the rows and one of the columns;

a plurality of letter symbols on the substrate and positioned at a plurality of the multiple spaces defined by the board;

a plurality of different row grid coordinates on the substrate and associated with the multiple rows of the board;

a plurality of different column grid coordinates on the substrate and associated with the multiple columns of the board;

a plurality of player letter symbols on the substrate;

a player bonus grid coordinate associated with one of the letter symbols on the substrate, the player bonus grid coordinate comprising one of the plurality of different row grid coordinates and one of the plurality of different column grid coordinates;

a first removable covering on the substrate covering the player letter symbols; and a second removable covering on the substrate covering the player bonus grid coordinate.

2. The lottery ticket of claim 1, wherein the board is a crossword board.

3. The lottery ticket of claim 2, which comprises a plurality of a second symbols of a second type in a plurality of the multiple spaces.

4. The lottery ticket of claim 3, wherein the plurality of the second symbols are space filler symbols.

5. The lottery ticket of claim 4, which comprises an award paytable on the substrate.

6. The lottery ticket of claim 5, wherein award paytable defines a first type award for each combination of the player letter symbols that correspond to the letter symbols of any complete word on the crossword board.

7. The lottery ticket of claim 5, wherein award paytable defines a second type award for each combination of the player letter symbols and player bonus grid coordinates that correspond to the letter symbols of any complete word on the crossword board.

8. The lottery ticket of claim 5, wherein award paytable defines a third type award for each combination of the player bonus grid coordinates that correspond to all of the letter symbols of any complete word on the crossword board.

9. The lottery ticket of claim 5, where the award paytable defines awards based on a quantity of completed words on the crossword board.

10. The lottery ticket of claim 1, which is a physical lottery ticket, wherein the first removeable covering is a first scratch-off coating on the substrate, and the second removable coating is a second scratch-off coating on the substrate.

11. A lottery ticket comprising:

a substrate;

a crossword board on the substrate, the crossword board comprising multiple rows and multiple columns, the crossword board defining multiple spaces, each space being at a different intersection of one of the rows and one of the columns;

a plurality of different letter symbols on the substrate and positioned at a plurality of the multiple spaces defined by the crossword board;

a plurality of different space filler symbols on the substrate and positioned at a plurality of the multiple spaces defined by the crossword board;

a plurality of different row grid coordinates on the substrate and associated with the multiple rows of the crossword board;

a plurality of different column grid coordinates on the substrate and associated with the multiple columns of the crossword board;

a plurality of different player letter symbols on the substrate;

a plurality of different player bonus grid coordinates on the substrate, each of the different player bonus grid coordinates comprising one of the plurality of different row grid coordinates and one of the plurality of different column grid coordinates;

a first removable covering on the substrate covering the player letter symbols;

a second removable covering on the substrate covering the player bonus grid coordinates; and an award paytable on the substrate, the award paytable associated with the crossword board, and the award paytable defining three or more different awards, wherein the different awards comprise: (i) a first type award for each combination of the player letter symbols that correspond to the letter symbols of any complete word on the crossword board, (ii) a second type award for each combination of the player letter symbols and player bonus grid coordinates that correspond to the letter symbols of any complete word on the crossword board, (iii) a third type award for each combination of the player bonus grid coordinates that correspond to all of the letter symbols of any complete word on the crossword board, (iv) a fourth type award for each of the player bonus grid coordinates that correspond to any space filler symbols on the crossword board; (v) a fifth type award based on a quantity of completed words on the crossword board; and (v) a sixth type award based on a quantity of bonus grid coordinates that correspond to a quantity of designated space filler symbols.

12. The lottery ticket of claim 11, which is a physical lottery ticket, wherein the first removeable covering is a first scratch-off coating on the substrate, and the second removable coating is a second scratch-off coating on the substrate.

13. The lottery ticket of claim 11, which is a virtual lottery ticket.

14. The lottery ticket of claim 11, wherein the different awards comprise at least four of: (i) the first type award, (ii) the second type award, (iii) the third type award, (iv) the fourth type award; (v) the fifth type award; and (vi) the sixth type award.

15. The lottery ticket of claim 11, wherein the different awards comprise each of: (i) the first type award, (ii) the second type award, (iii) the third type award, and (iv) the fourth type award.

16. A lottery gaming system comprising:

a processor;

a memory device that stores a plurality of instructions, that when executed by the processor, cause the processor to cause a lottery ticket to be created, the lottery ticket comprising:

a substrate;

a board on the substrate, the board comprising multiple rows and multiple columns, the board defining multiple spaces, each space being at a different intersection of one of the rows and one of the columns;

a plurality of letter symbols on the substrate and positioned at a plurality of the multiple spaces defined by the board;

a plurality of row grid coordinates on the substrate and associated with the multiple rows of the board;

a plurality of column grid coordinates on the substrate and associated with the multiple columns of the board;

a plurality of player letter symbols on the substrate;

a player bonus grid coordinate associated with one of the letter symbols positioned at a plurality of the multiple spaces on the substrate, the bonus grid coordinate comprising one of the plurality of row grid coordinates and one of the plurality of column grid coordinates;

a first removable covering on the substrate covering the player first symbols; and a second removable covering on the substrate covering the player bonus grid coordinate.

17. The lottery gaming system of claim 16, wherein the lottery ticket is a physical ticket, wherein the first removeable covering is a first scratch-off coating on the substrate, and the second removable coating is a second scratch-off coating on the substrate.

18. The lottery gaming system of claim 16, wherein the lottery ticket is a virtual ticket.

19. The lottery gaming system of claim 16, wherein the board is a crossword board and wherein the lottery ticket comprises an award paytable on the substrate, the award paytable defining a plurality of awards associated with the lottery ticket, the awards comprising at least two of: (i) a first type award for each combination of the player first symbols that correspond to the letters of any complete pattern on the board; (ii) a second type award for each combination of the player letters and player bonus grid coordinates that correspond to the letters of any complete pattern on the board; (iii) a third type award for each combination of the player bonus grid coordinates that correspond to all of the letters of any complete pattern on the board; and (iv) a fourth type award based on a quantity of completed words on the crossword board.

* * * * *